Oct. 16, 1951  J. R. MORROW  2,571,277
GRAIN STORAGE TERMINAL
Filed May 24, 1949  2 Sheets-Sheet 1
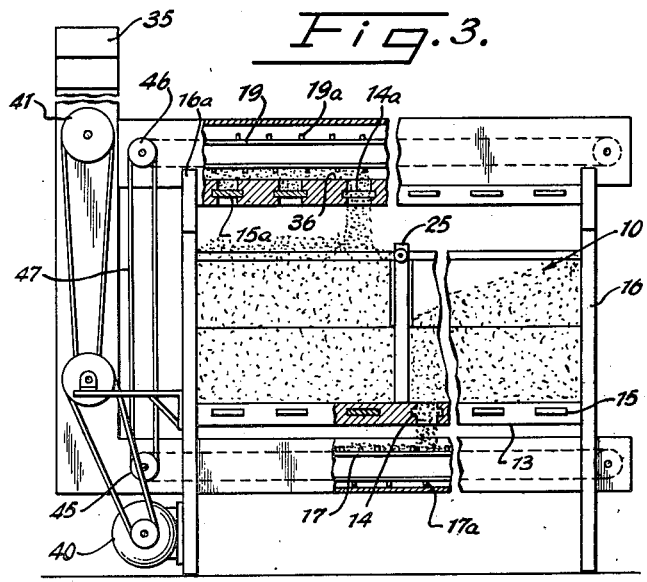
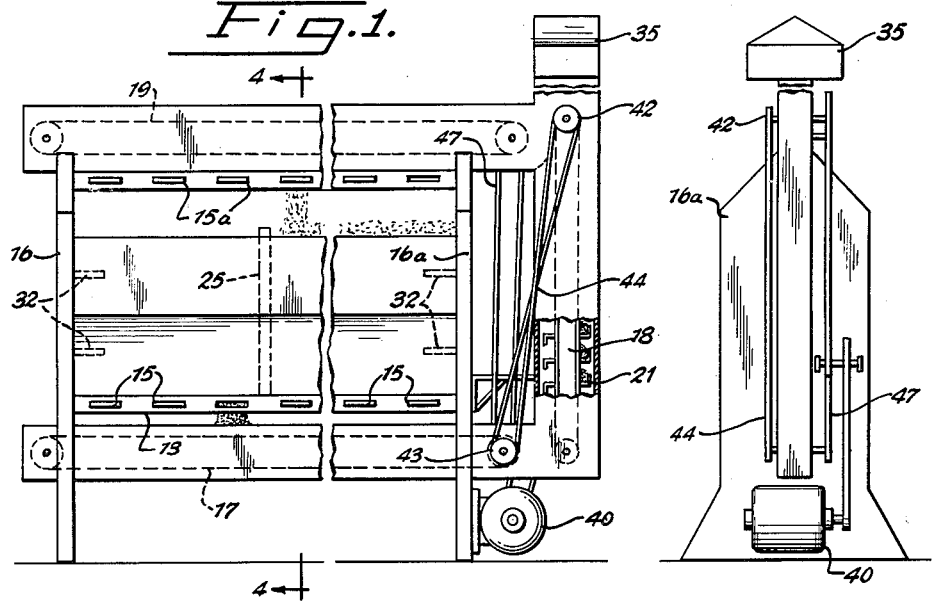
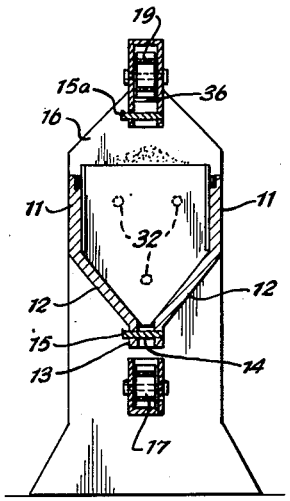
INVENTOR.
JAMES R. MORROW.
BY
Munn, Liddy & Daccum
ATTORNEYS

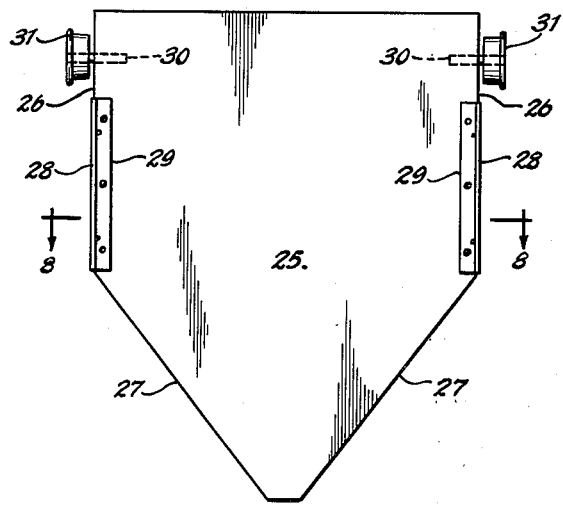
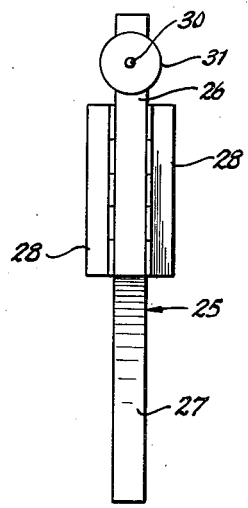
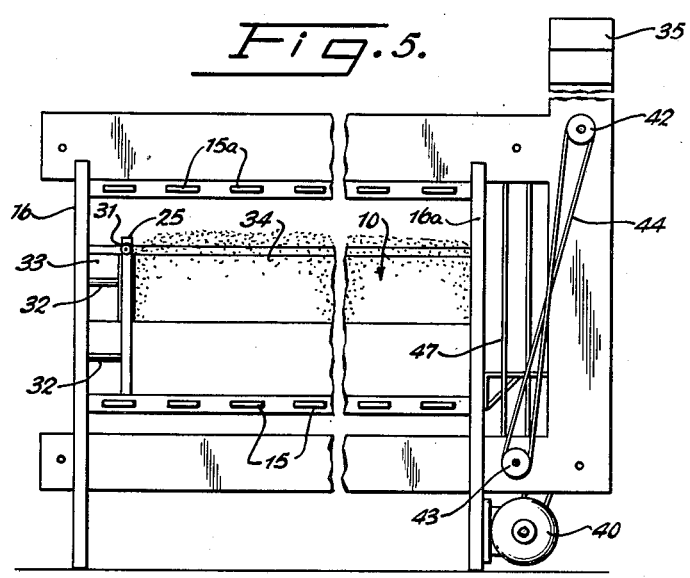
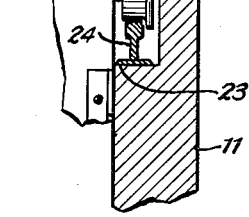
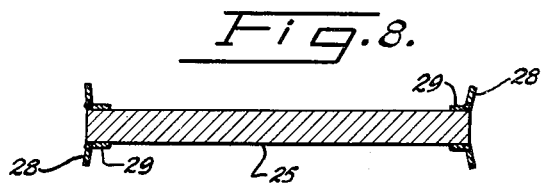

Patented Oct. 16, 1951

2,571,277

UNITED STATES PATENT OFFICE 2,571,277

GRAIN STORAGE TERMINAL

James R. Morrow, Meadow, Tex.

Application May 24, 1949, Serial No. 95,053

8 Claims. (Cl. 214—17)

My invention relates to grain storage terminals and more specifically to a storage terminal constructed in the form of a large single bin having a traveling partition or bulkhead therein.

An object of my invention is to provide in a single bin grain storage terminal, a bulkhead which may be caused to travel automatically from one end of the bin to the other by varying the amount of grain on the opposite sides thereof.

Another object of the invention is to provide a conveying and elevating structure to empty the grain from the bin from below on one side of the bulkhead and deposit it from above on the other side thereof.

A further advantage of this invention is the provision of a plurality of bumpers at each end of the bin to limit the movement of the bulkhead in one direction in order to maintain a small space between the bulkhead and the ends.

A still further object of the invention is to provide a hinged flap structure at each end of the traveling bulkhead to assure contact with the bin walls in the event of unevenness in the construction thereof. By such a construction the flaps are held in place against the walls by the pressure of the grain in the bin and prevents same from leaking around the edge of the bulkhead.

Still other objects and advantages will become apparent from the following description of the present invention illustrated in the accompanying drawings in which:

Figure 1 is a fragmentary front elevation embodying the present improvements.

Figure 2 is an end elevation of Fig. 1.

Figure 3 is a fragmentary rear view of the structure with some of the parts thereof broken away.

Figure 4 is a sectional view taken on line 4—4 of Fig. 1.

Figure 5 is a fragmentary front elevation similar to Fig. 1 showing the bulkhead in a starting position at one end of the bin.

Figure 6 is an elevational view showing the face of my traveling bulkhead.

Figure 7 is an end view of the bulkhead shown in Fig. 6.

Figure 8 is a sectional view of the bulkhead taken on line 8—8 of Fig. 6 illustrating the hinged flap structure.

Figure 9 is a detail view of the bulkhead supporting means.

Similar reference characters represent similar parts in the several figures.

In storing large quantities of grain, frequent turning is necessary to prevent heating and molding. At the present time conventional grain storage terminals are constructed in the form of a series of separate bins. These bins are lined up in a row and are all connected from above and below by conveying and elevating means. The method of operation consists of emptying one bin of grain, elevating said grain and depositing same in another bin. The construction of the bins is of either circular or elliptical design, as viewed in plan. Because of the intense outward pressure of the grain deposited in the bins, they are relatively small in diameter, usually about twenty feet. Further since the diameter is so small, the bins must be made very high in order to obtain a worth while amount of storage space.

From the above it is clear that a large area, high financial outlay and time-consuming efforts are necessary in the construction thereof. Further it is always necessary to have a vacant bin available in which to deposit the grain being emptied from another bin.

My grain storage terminal obviates the above-mentioned disadvantages by constructing a single large bin 10 capable of handling an amount of grain approximately equal to the capacity of sixty of the conventional type bins. The bin 10 is constructed of reinforced concrete comprising a pair of spaced upper vertical walls 11, and downwardly converging walls 12 depending from the upper vertical walls. A neck portion having vertical side walls 13 is located at the lower end of walls 12. At the base of the bin I provide a floor or bottom connecting the vertical walls 13. The floor is provided with a series of openings 14 therein, spaced as desired, to obtain the necessary flow of grain therethrough as hereinafter described. In order to selectively open and close the openings 14, a plurality of manually operated sliding panels 15 are utilized.

End walls 16 and 16a, also constructed of reinforced concrete, join opposite ends of walls 11, 12 and 13. Projecting inwardly from walls 16 and 16a is a plurality of steel bumpers 32. Since the bumpers are the same at both ends of the bin, a description of one end will suffice. As seen in Fig. 5 these bumpers are adapted to arrest the forward movement of the traveling bulkhead 25 toward the end of the bin to which the bumpers are connected. A further use of bumpers 23 is to furnish a space 33 between bulkhead 25 and bin end 16. The space between the bulkhead 25 and the bin end 16a is designated as 34.

While the specific conveying, elevating and grain treating means do not necessarily form part of my invention, a brief description thereof follows.

Beneath the openings 14 in the floor of the bin and running longitudinally therewith is provided a lower horizontal conveyor 17. This conveyor may be of the conventional endless belt type or it may be an endless belt type provided with spade-like projections 17a, as shown in Fig. 3. Adjacent the end 16a and running vertically therewith is an elevator 18. This also is of the endless belt type and is provided with buckets 21. At the upper end of the elevator a head house 35 is provided. There the grain is received and any one of a plurality of operations such as weighing or drying may be performed.

In vertical alignment with the lower conveyor 17 and supported by end walls 16 and 16a is provided an upper horizontal conveyor 19, also of the endless belt type provided with spade-like projections 19a. Immediately below said conveyor 19 and running longitudinally therewith a floor or chute 36 is provided. A plurality of openings 14a are spaced intermittently therein similar to openings 14 in the bin floor. Manually operated sliding panels 15a are furnished to selectively regulate the flow of grain therethrough.

The specific drive means for operating the conveyors and elevators does not necessarily form a part of the invention. It is sufficient to say that a motor 40 is connected to the elevator driving pulley 41 on one side of the elevator, by a suitable speed reducing pulley and belt arrangement, shown in Figs. 2 and 3. On the opposite side of the elevator a pulley 42 is mounted to rotate with pulley 41. The lower conveyor is provided on one side thereof with a driving pulley 43 which is connected by a belt 44 with said pulley 42 in such a manner that the pulleys will turn in opposite directions. On the other side of conveyor 17 is mounted a pulley 45 to rotate with pulley 43. The upper conveyor 19 is furnished with a pulley 46 similar to pulley 43 and a belt 47 connects them.

However, it will be obvious to a person skilled in the instant art that many different drive means might be used and that I do not wish to be limited to the particular means disclosed.

As best shown in Fig. 9, the upper ends of the side walls 11 are provided with an integral upwardly projecting lip portion 22. At the upper end portion of the wall and inwardly of the lip portion is provided a base 23 for supporting the rails 24.

The traveling bulkhead 25, best illustrated in Fig. 6, is of a single piece construction and is shaped with end portions 26 and 27 to conform with the bin walls 11 and 12, respectively. Along each of said end portions 26 and 27 is provided a hinged flap member 28. This flap is pivotally connected to an associated member 29 which is rigidly fixed on the side of the bulkhead adjacent the end by any convenient means. The function of flap 28 is to compensate for any unevenness in the bin side walls as set forth in the objects recited above.

At the upper portion of each of the bulkhead ends is provided a stub shaft 30 fixedly embedded therein and projecting outwardly therefrom. At the free ends of the stub shafts flanged wheels 31 are provided which are adapted to be supported on and guided by the rails 24 on the bin walls 11, thereby allowing the bulkhead to travel from one end of the bin to the other.

In order to overcome the size limitations previously recited concerning conventional grain storage terminals, I propose to place a larger portion of the structure beneath the ground so that walls 11 and 12 of the bin will be supported thereby. The top of the walls will be approximately at ground level.

The operation and use of the traveling bulkhead, which forms the major portion of my invention, involves a completely new principle as far as grain storage terminals are concerned. An explanation thereof follows:

Figure 5 of the drawings shows the bulkhead in a starting position abutting the buffer 32 adjacent the bulkhead end 16. The space 34 is completely filled with grain. The basis upon which the bulkhead is automatically moved to the other end of the bin is a matter of pressure differential. In the starting position the static pressure of the grain on one side of the bulkhead is equal to the resisting pressure the bumpers exert on the other side thereof. Therefore, to cause the bulkhead to move forward to the end 16a, the pressure of the grain in space 34 on the bulkhead must be relieved, and since the bumpers have no way of applying a positive force a means must be provided therefor. By allowing the grain to flow from the space 34 immediately in front of the bulkhead and depositing same from above into the space 33, a positive force can be built up within the latter space to apply against the bulkhead.

The transferring of grain is accomplished by removing one of the sliding panels 15 immediately in front of the bulkhead to allow the grain to flow therethrough onto the lower conveyor. The latter deposits the grain in a manner that allows the elevator to pick it up and carry it to the head house 35. As previously stated, any one of a plurality of conventional operations may take place here, after which it is deposited in the chute 36. The upper conveyor projections 19a then rake the grain across the chute. One of the panels 15a immediately rearwardly of the bulkhead is removed and the grain flows therethrough into space 33.

As the grain in space 33 begins to increase in height next to the bulkhead, the grain on the other side thereof will be diminishing in height. It will, therefore, be seen that a point of static equilibrium will be reached when the level of grain on both sides of the bulkhead is equal. A further increase in height in space 33 results in a decrease in height in space 34 thereby causing a pressure differential on the sides of the bulkhead. When the difference in pressure attains a sufficient amount the bulkhead will be moved forwardly towards the end 16a.

Upon reaching this destination the same process can be put into operation and the bulkhead will return to end 16. Figure 3 is illustrative of the relative grain heights on the return trip.

The only manual operation of the storage terminal is to remove the sliding panel 15 in the floor of the bin immediately ahead of the traveling bulkhead and to replace the panels immediately therebehind. Also the openings 14a in the chute 36 are progressively opened and closed so that grain is allowed to flow therethrough at a point immediately behind the bulkhead.

As seen in Figs. 3 and 4, the portion of the bin being filled from above is heaped with grain. It has been found that because the grain is deposited centrally between the walls 11, the grain may be heaped to a point where the surface thereof forms approximately a 27° angle with respect to the horizontal. This heaping not only gives added storage space but further impetus to the moving bulkhead.

In designing the size of space 33, it should be capable of holding the same amount of grain that can be heaped on top of the grain in space 34 in Fig. 5. This allows for maximum grain storage. Otherwise stated, the space 33 in Fig. 5 should be equal to the waste space above the grain on the side of the bulkhead from which the grain is being emptied, as best seen in Fig. 3.

The actual dimensions of my terminal would be predicated by the storage volume demand. It has been conservatively estimated that the cost of constructing the above terminal is approximately 8½% of the cost of a conventional type terminal of equal storage volume. This feature alone is enough to show how this type of construction will revolutionize the grain industry. The cut in cost materially reduces the storage cost.

From the foregoing description of my invention it will be seen that the use of a traveling bulkhead in a large single bin, automatically moved by merely performing a necessary operation on the grain stored therein, will cut down waste space in the bin, reduce the amount of materials required for construction, cut labor costs, and further, it will reduce the operation expense of the terminal.

While a preferred form of the invention has been shown and described it will be understood that variation in details of form may be made without departure from the invention as defined in the appended claims.

I claim:

1. In a grain storage terminal, an elongated grain receiving bin having downwardly converging side walls, end walls connecting said side walls, a plurality of openings in the bottom of said bin, means for selectively controlling the flow of grain through said openings, a transversely disposed bulkhead slidably supported by said side walls for longitudinal movement, and means receiving grain from one side of the bulkhead and depositing it on the other side thereof.

2. In a grain storage terminal, an elongated grain receiving bin having downwardly converging side walls, a transversely disposed bulkhead slidably supported by said side walls thereby forming separate grain receiving sections, means for varying the capacity of said grain receiving sections including a conveyor system for transferring grain from one of said sections to the other thereby creating a grain pressure differential between the two sides of said transverse bulkhead causing the bulkhead to automatically move longitudinally of the bin.

3. In a grain storage terminal, an elongated grain receiving bin having downwardly converging side walls, end walls connecting said side walls, a bulkhead slidably supported on said side walls for longitudinal movement, thereby forming separate grain receiving sections, means adjacent the end of the bin to limit the longitudinal movement of said bulkhead and means for removing the grain from one of said sections in front of said bulkhead during said longitudinal movement and depositing it in the other of said sections.

4. In a grain storage terminal, an elongated grain receiving bin having downwardly converging side walls, end walls connecting said side walls, a plurality of openings in the bottom of said bin, means for selectively controlling the flow of grain through said openings, a transversely disposed bulkhead slidably supported by said side walls for longitudinal movement, and a conveying and elevating means adapted to receive the grain from said openings on one side of the bulkhead and depositing it on the other side thereof.

5. In a grain storage terminal, an elongated grain receiving bin having downwardly converging side walls, end walls connecting said side walls, a plurality of openings in the bottom of said bin, means for selectively controlling the flow of grain through said openings, a transversely disposed bulkhead slidably supported by said side walls for longitudinal movement, means for creating a pressure differential to move said bulkhead from one end of the bin to the other thereby varying the storage space on either side thereof, said means including a conveying and elevating mechanism adapted to receive the grain from said bin openings on one side of said bulkhead and deposit it on the other side thereof.

6. In a grain storage terminal, an elongated grain receiving bin having spaced side walls, end walls connecting said side walls, a transversely disposed bulkhead slidably supported in said bin for longitudinal movement intermediate said end walls, and means for moving the grain from one side of said bulkhead and depositing it on the other side thereof, thereby creating a pressure differential on the sides of said bulkhead causing the bulkhead to move longitudinally of the bin in the direction of the low pressure side of the bulkhead.

7. In a grain storage terminal, a grain receiving bin having a pair of spaced side walls, a pair of end walls connecting said side walls, a bulkhead positioned in said bin parallel to one pair of said walls, means in said bin providing free sliding movement of said bulkhead thereby forming separate variable grain receiving sections, and means for varying the capacity of said grain receiving sections including a conveyor system for transferring grain from one of said sections to the other thereby creating a grain pressure differential between the two sides of said bulkhead causing the bulkhead to automatically move relative to said one pair of said walls.

8. In a grain storage terminal, an elongated grain receiving bin having spaced side walls, end walls connecting said side walls, a plurality of openings in the bottom of said bin, means for selectively controlling the flow of grain through said openings, a transversely disposed bulkhead supported in said bin for freely sliding longitudinal movement, means for receiving grain from one side of the bulkhead and depositing it on the other side thereof, and means at one end of said bin to arrest the movement of the bulkhead in a position spaced from said end.

JAMES R. MORROW.

REFERENCES CITED

The following references are of record in the file of this patent:

UNITED STATES PATENTS

| Number | Name | Date |
|---|---|---|
| 1,420,726 | Montague et al. | June 27, 1922 |
| 1,757,185 | Glidden | May 6, 1930 |
| 2,301,866 | Goodall | Nov. 10, 1942 |
| 2,314,463 | Schwebs | Mar. 23, 1943 |
| 2,342,528 | Carbaugh | Feb. 22, 1944 |